(12) United States Patent
Huang et al.

(10) Patent No.: US 12,500,273 B2
(45) Date of Patent: Dec. 16, 2025

(54) ELECTROLYTIC SOLUTION, SECONDARY BATTERY, AND POWER CONSUMPTION APPARATUS

(71) Applicant: CONTEMPORARY AMPEREX TECHNOLOGY (HONG KONG) LIMITED, Hong Kong (CN)

(72) Inventors: Lei Huang, Fujian (CN); Changlong Han, Fujian (CN); Zeli Wu, Fujian (CN); Cuiping Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 481 days.

(21) Appl. No.: 18/072,720

(22) Filed: Dec. 1, 2022

(65) Prior Publication Data

US 2023/0117520 A1    Apr. 20, 2023

Related U.S. Application Data

(63) Continuation of application No. PCT/CN2021/124097, filed on Oct. 15, 2021.

(51) Int. Cl.
*H01M 10/0569* (2010.01)
*H01M 4/02* (2006.01)
(Continued)

(52) U.S. Cl.
CPC ..... *H01M 10/0569* (2013.01); *H01M 4/5825* (2013.01); *H01M 10/0567* (2013.01);
(Continued)

(58) Field of Classification Search
None
See application file for complete search history.

(56) References Cited

U.S. PATENT DOCUMENTS

| 8,252,467 B2 | 8/2012 | Takahashi |
| 2009/0170007 A1 | 7/2009 | Takahashi |

(Continued)

FOREIGN PATENT DOCUMENTS

| CN | 101442143 A | 5/2009 |
| CN | 101931096 A | 12/2010 |

(Continued)

OTHER PUBLICATIONS

International Search Report and Written Opinion mailed on Jul. 15, 2022, received for PCT Application PCT/CN2021/124097, filed on Oct. 15, 2021, 14 pages including English Translation.

(Continued)

*Primary Examiner* — Kevin M Bernatz
(74) *Attorney, Agent, or Firm* — XSENSUS LLP

(57) ABSTRACT

The present application provides an electrolytic solution, a secondary battery, and a power consumption apparatus. The electrolytic solution may include a solvent and an additive; the solvent may include a compound of formula I, and a mass percentage of the compound of formula I in the solvent may be 35% or more; in formula I, $R_1$ and $R_2$ are each independently selected from any one of a hydrogen atom, a C1-C3 chain alkyl group, and a C2-C3 alkenyl group; and the additive may include a compound of formula II, and in formula II, $R_3$, $R_4$, and $R_5$ are each independently selected from any one of a hydrogen atom, a fluorine atom, a phenyl group, a cyano group, a C1-C6 chain alkyl group, a C3-C6 cyclic alkyl group, and a C2-C6 alkenyl group.

Formula I (Continued)

-continued

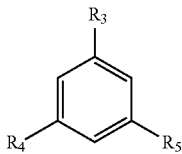

Formula II

19 Claims, 3 Drawing Sheets

(51) Int. Cl.
*H01M 4/58* (2010.01)
*H01M 10/0567* (2010.01)
*H01M 10/0568* (2010.01)

(52) U.S. Cl.
CPC .. *H01M 10/0568* (2013.01); *H01M 2004/028* (2013.01); *H01M 2300/0037* (2013.01); *H01M 2300/0051* (2013.01)

(56) References Cited

U.S. PATENT DOCUMENTS

| | | | |
|---|---|---|---|
| 2011/0269028 A1 | 11/2011 | Takahashi | |
| 2016/0211548 A1* | 7/2016 | Jin | H01M 10/0525 |
| 2018/0048020 A1* | 2/2018 | Zou | H01M 4/364 |
| 2018/0108937 A1* | 4/2018 | Drach | H01M 10/0569 |
| 2019/0198932 A1* | 6/2019 | Newhouse | H01M 10/052 |
| 2020/0243911 A1* | 7/2020 | Kuwajima | H01M 10/0569 |
| 2022/0102700 A1* | 3/2022 | Ma | H01M 4/133 |
| 2024/0014444 A1* | 1/2024 | Chen | H01M 10/0567 |

FOREIGN PATENT DOCUMENTS

| | | |
|---|---|---|
| CN | 105680088 A | 6/2016 |
| CN | 107086287 A | 8/2017 |
| CN | 108511802 A | 9/2018 |
| CN | 108878980 A | 11/2018 |
| CN | 110034333 A | 7/2019 |
| CN | 110945706 A | 3/2020 |
| CN | 113140793 A | 7/2021 |
| JP | 2001-126765 A | 5/2001 |
| JP | 2003-086242 A | 3/2003 |
| JP | 2008-198409 A | 8/2008 |
| JP | 2009-163937 A | 7/2009 |
| JP | 2010-529618 A | 8/2010 |
| JP | 2011-071098 A | 4/2011 |
| JP | 2013-171758 A | 9/2013 |
| JP | 2016-184462 A | 10/2016 |
| JP | 2017-117684 A | 6/2017 |
| JP | 2020-080327 A | 5/2020 |
| JP | 2020-202149 A | 12/2020 |
| JP | 2021-022451 A | 2/2021 |
| KR | 10-2018-0087162 A | 8/2018 |
| WO | 2015/046475 A1 | 4/2015 |
| WO | 2017/154592 A1 | 9/2017 |
| WO | 2019/150895 A1 | 8/2019 |
| WO | 2021/038922 A1 | 3/2021 |

OTHER PUBLICATIONS

Reconsideration Report by Examiner before Appeal issued Feb. 20, 2025 in Japanese Patent Application No. 2022-552955 (Appeal No. 2024-017557) with machine English translation thereof.
Extended European Search Report issued Oct. 28, 2024 in European Patent Application No. 21942141.9.
Office Action issued Jan. 13, 2025 in Korean Patent Application No. 10-2022-7030701 with English translation thereof.
Japanese Office Action issued Dec. 25, 2023 in Japanese Patent Application No. 2022-552955 with machine English translation thereof.
Office Action issued Sep. 2, 2025 in Japanese Patent Application No. 2022-552955 (Appeal No. 2024-17557) with English translation thereof.

* cited by examiner

ELECTROLYTIC SOLUTION, SECONDARY BATTERY, AND POWER CONSUMPTION APPARATUS

CROSS-REFERENCE TO RELATED APPLICATION

The present application is a continuation of International Application No. PCT/CN2021/124097, filed Oct. 15, 2021, the entire content of which is incorporated herein by reference in its entirety.

TECHNICAL FIELD

The present application relates to the technical field of batteries, and in particular, to an electrolytic solution, a secondary battery, and a power consumption apparatus.

BACKGROUND

In recent years, secondary batteries have been widely used in energy storage power systems such as hydropower, firepower, wind power and solar power plants, as well as many fields such as, electric tools, electric bicycles, electric motorcycles, electric mobiles, military devices, and aerospace.

As secondary batteries have been greatly developed, higher demands have been placed on their energy density, cycle performance, safety performance, or the like.

SUMMARY

The present application is made in view of the foregoing problems, and an objective is to provide an electrolytic solution, a secondary battery, and a power consumption apparatus. A secondary battery using an electrolytic solution according to some embodiments of the present application can achieve good kinetic performance, high-temperature performance, as well as excellent overcharge prevention performance.

In order to achieve the foregoing objective, according to a first aspect of the present application, an electrolytic solution is provided, including a solvent and an additive, where the solvent includes a compound of formula I, and a mass percentage of the compound of formula I in the solvent is 35% or more,

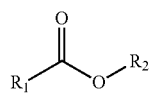

Formula I where $R_1$, and $R_2$ are each independently selected from any one of a hydrogen atom, a C1-C3 chain alkyl group, and a C2-C3 alkenyl group;

the additive includes a compound of formula II,

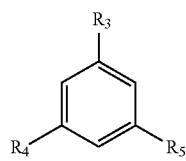

Formula II where $R_3$, $R_4$, and $R_5$ are each independently selected from any one of a hydrogen atom, a fluorine atom, a phenyl group, a cyano group, a C1-C6 chain alkyl group, a C3-C6 cyclic alkyl group, and a C2-C6 alkenyl group.

In some embodiments of the present application, an electrolytic solution includes a compound of formula I and a compound of formula II, and good kinetic performance, high-temperature performance, and excellent overcharge prevention performance can be taken into account.

In one embodiment, the mass percentage of the compound of formula I in the solvent may be 40%-70%. In the present application, the mass percentage of the compound of formula I in the solvent is set to the foregoing range, and it can ensure that the electrolytic solution has high conductivity and low viscosity and can be applied to a thick coating system. The kinetic performance of the battery can be further improved.

In one embodiment, a mass percentage of the compound of formula II in the electrolytic solution may be 9% or less, optionally 3%-5%. In the present application, the mass percentage of the compound of formula II in the electrolytic solution is set to the foregoing range, and the overcharge prevention performance can be further improved.

In one embodiment, the compound of formula I may include at least one selected from methyl formate, methyl acetate, ethyl acetate, propyl acetate, methyl acrylate and ethyl acrylate. In the present application, the foregoing compound is selected, and the kinetic performance can be further improved.

In one embodiment, the compound of formula II may include at least one of biphenyl, fluorobenzene and cyclohexylbenzene. In the present application, the foregoing compound is selected, and the overcharge prevention performance can be further improved.

In one embodiment, the electrolytic solution may make true $a/b \geq 11$, optionally $11 \leq a/b \leq 35$, where a is a mass percentage of the compound of formula I in the solvent, and b is a mass percentage of the compound of formula II in the electrolytic solution. In the present application, a/b is set to the foregoing range, and the kinetic performance and the overcharge prevention performance can be further improved.

In one embodiment, the electrolytic solution may further include an electrolyte salt, and the electrolyte salt may include a compound of formula III, optionally a molar percentage of the compound of formula III in the electrolyte salt is 10% or more, optionally 20% or more,

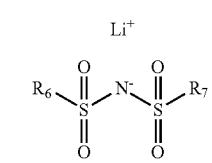

Formula III where $R_6$ and $R_7$ are each independently an F atom or a fluoroalkyl group, and $R_6$ and $R_7$ are linked to form a cycle.

In some embodiments of the present application, the compound of formula III is added to the electrolytic solution, the molar percentage of the compound of formula III in the electrolyte salt is set to the foregoing range, the resistance of the electrolytic solution to water can be improved, and high-temperature cycle performance of the battery can be improved.

In one embodiment, the compound of formula III may include at least one selected from lithium bisfluorosulfonimide and lithium bis(trifluoromethanesulfonyl)imide. The foregoing compound is selected, and the resistance of the electrolytic solution to water can be further improved, and high-temperature cycle performance of the battery can be improved.

In one embodiment, the solvent may further include a carbonate, and a mass percentage of the carbonate in the solvent is 30% or more, optionally 35%-65%, more optionally 40%-50%.

In one embodiment, the solvent may further include ethylene carbonate, and a mass percentage of the ethylene carbonate in the solvent is 30% or more.

The solvent further includes carbonate, and the mass percentage of the carbonate in the solvent is set to the foregoing range, which can ensure sufficient dissociation of the electrolyte, especially the lithium salt, and stable film formation of the negative electrode. Thus stability of a negative electrode interface is improved.

In one embodiment, the additive may further include at least one selected from vinylene carbonate (VC), fluoroethylene carbonate (FEC), vinyl sulfate (DTD), 1,3-propane sultone (PS), lithium difluorobisoxalate phosphate (LiDFOP), lithium difluoro(oxalato)borate (LiDFOB), and lithium bis(oxalato)borate (LiBOB). The additive is added, and cycle performance and thermal stability of the battery can be further improved.

According to a second aspect of the present application, a secondary battery is provided, including the electrolytic solution of the first aspect. The secondary battery of the present application can achieve good kinetic performance, high-temperature performance, as well as excellent overcharge prevention performance.

In one embodiment, the secondary battery may include a positive electrode sheet, the positive electrode sheet includes a positive electrode film layer, the positive electrode film layer may include a positive active material, and the positive active material may include an olivine-structured lithium-containing phosphate. The olivine-structured lithium-containing phosphate is used as a positive active material, and cycle life can be improved.

In one embodiment, the secondary battery may make true 1 g/1000 m$^2$≤L≤5 g/1000 m$^2$, preferably 1 g/1000 m$^2$≤L≤4 g/1000 m$^2$, more preferably 1.5 g/1000 m$^2$≤L≤4 g/1000 m$^2$. L=M1/[M2×B×(a+c)]*1000, M1 is mass of the compound of formula II with a unit of g, M2 is mass of the positive active material with a unit of g, b is a specific surface area of the positive active material with a unit of m$^2$/g, a is a mass percentage of the compound of formula I in the solvent, and c is a molar percentage of the compound of formula III in the electrolyte salt. L is in the foregoing range, and the kinetic performance, high-temperature performance, and overcharge prevention performance of the battery can be further improved.

In one embodiment, 8 m$^2$/g≤B≤16 m$^2$/g, optionally 10 m$^2$/g≤B≤14 m$^2$/g. The specific surface area of the positive active material is set to the foregoing range, and solid phase diffusion inside the positive electrode sheet can be improved, which is conducive to improving the kinetic performance of the battery cell.

In one embodiment, a thickness of the single-faced positive electrode film layer is 0.08 mm or more, optionally 0.09 mm-0.3 mm.

According to a third aspect of the present application, a power consumption apparatus is provided, including the secondary battery of the second aspect. The power consumption apparatus of the present application includes the foregoing secondary battery, and therefore has all the advantageous effects of the secondary battery.

Effects of Application

According to some embodiments of the present application, good kinetic performance, high-temperature performance, as well as excellent overcharge prevention performance of the battery can be taken into account.

DESCRIPTION OF REFERENCE SIGNS

Figure 1:
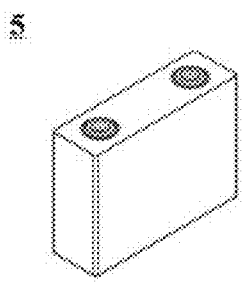
FIG. 1 is a schematic diagram of a secondary battery according to an embodiment of the present application.

1: battery pack; 2: upper box; 3: lower box; 4: battery module; 5: secondary battery; 51: housing; 52: electrode assembly; 53: top cover assembly.

DESCRIPTION OF EMBODIMENTS

Hereinafter, embodiments that specifically disclose an electrolytic solution, a secondary battery, and a power consumption apparatus of the present application will be described in detail with reference to the accompanying drawings as appropriate. However, unnecessarily detailed descriptions may be omitted in some cases. For example, detailed descriptions of well-known matters and repeated descriptions of practically identical structures are omitted. This is done to avoid unnecessarily redundant descriptions for ease of understanding by persons skilled in the art. In addition, the drawings and the following description are provided for a full understanding of the present application by persons skilled in the art, and are not intended to limit the subject matter in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

The present application provides an electrolytic solution, a secondary battery including the electrolytic solution, and a power consumption apparatus including the secondary battery. The electrolytic solution, the secondary battery, and the power consumption apparatus of the present application are described in detail below.

Electrolytic Solution

In an embodiment of the present application, an electrolytic solution is provided, including a solvent and an additive, where the solvent includes a compound of formula I, and a mass percentage of the compound of formula I in the solvent is 35% or more,

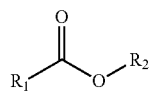

Formula I where $R_1$, and $R_2$ are each independently selected from any one of a hydrogen atom, a C1-C3 chain alkyl group, and a C2-C3 alkenyl group;

the additive includes a compound of formula II,

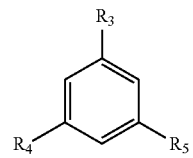

Formula II where $R_3$, $R_4$, and $R_5$ are each independently selected from any one of a hydrogen atom, a fluorine atom, a phenyl group, a cyano group, a C1-C6 chain alkyl group, a C3-C6 cyclic alkyl group, and a C2-C6 alkenyl group.

Although the mechanism is not clear yet, the applicant surprisingly found that: the compound of formula I and the compound of formula II both are used in the electrolytic solution, and the content of the compound of formula I is set to a specific amount. Therefore, good kinetic performance, high-temperature performance, as well as excellent overcharge prevention performance of the battery can be taken into account.

In a battery using lithium iron phosphate (such as LiFePO4 (LFP for short)) as a positive active material, in order to increase energy density, the most commonly used measure is to thicken a coating thickness of the positive electrode sheet so as to increase space efficiency of the internal portion of the battery cell, but thickened coating also brings new problems. Thickened coating of the positive electrode means that the transport path of lithium ions in the electrode sheet is lengthened, the transport of lithium ions is more difficult, and conductivity of the electrolytic solution needs to be further improved. This problem becomes more serious as the positive electrode coating thickens.

In order to solve this problem, the applicant found that a solvent with low viscosity and high dielectric constant (such as the foregoing compound of formula I) may be used in an electrolytic solution, which can greatly improve conductivity of the electrolytic solution, and improve the transport difficulties of lithium ions due to thick coating. However, an oxidation potential of the compound of formula I is low, which greatly affects overcharge performance of LFP battery cells. In order to reduce safety problems such as thermal runaway of the battery in the case of overcharging, the applicant found that the compound of formula II is added to the electrolytic solution to be used as an overcharge-prevention additive, and the purpose of increasing the safety of the battery can be improved. However, the addition of the overcharge-prevention additive such as, the compound of formula II affects the kinetic performance of the battery.

Through careful study, the applicant found that a specific content of the compound of formula I is added to an electrolytic solution containing the foregoing compound of formula II, the kinetic performance and high-temperature performance of the battery can be improved. Thus, through synergistic effect of the compound of formula I with the specific content and the compound of formula II, good kinetic performance, high-temperature performance, as well as overcharge prevention performance can be taken into account.

In some embodiments, the compound of formula I may be listed as methyl formate, methyl acetate, ethyl acetate, propyl acetate, methyl propionate, ethyl propionate, propyl propionate, methyl acrylate, ethyl acrylate, or the like. The compound of formula I preferably includes at least one selected from methyl formate, methyl acetate, ethyl acetate, propyl acetate, methyl acrylate and ethyl acrylate. More preferably, methyl formate and ethyl acetate are included. These compounds are used as a solvent for an electrolytic solution, these compounds have viscosity lower than that of linear carbonates, and have dielectric constants higher than those of the linear carbonates. These compounds are added to the electrolytic solution, and the linear carbonates can be replaced, thereby effectively increasing conductivity of the electrolytic solution, and further improving the kinetic performance of the battery.

The solvent of the electrolytic solution of the present application includes the compound of formula I, and a mass percentage of the compound of formula I in the solvent is 35% or more, preferably a mass percentage of the compound of formula I in the solvent is 40%-70%, preferably 50%-60%. When the mass percentage of the compound of formula I in the solvent is less than 35%, the conductivity decreases, initial DCR (Directive Current Resistance, directive current resistance) increases, resulting in deterioration of the kinetic performance of the battery. Therefore, in the present application, the mass percentage of the compound of formula I in the solvent is set to the foregoing range, and it can ensure that the electrolytic solution has high conductivity and low viscosity and can be applied to a thick coating system. The kinetic performance of the battery can be further improved. In addition, when the mass percentage of the compound of formula I in the solvent is greater than 70%, it is not conducive to the overcharge prevention performance.

In addition, in the present application, the solvent of the electrolytic solution may further include one or two or more carbonates selected from ethylene carbonate (EC), propylene carbonate (PC), dimethyl carbonate (DMC), ethyl methyl carbonate (EMC) and diethyl carbonate (DEC). A mass percentage of the foregoing carbonate in the solvent may be 30% or more, preferably 35%-65%, more preferably 40%-50%. Ethylene carbonate is preferably included; further preferably, a mass percentage of the ethylene carbonate in the solvent is 30% or more. The solvent includes ethylene carbonate, and the mass percentage of the ethylene carbonate in the solvent is set to the foregoing range, which can ensure sufficient dissociation of the electrolyte, especially the lithium salt, and stable film formation of the negative electrode. Thus stability of a negative electrode interface is improved.

In some embodiments, the electrolytic solution of the present application includes the compound of formula II as an additive, and the compound of formula II acts as an overcharge prevention agent. Preferably, the compound of formula II may include at least one selected from biphenyl, fluorobenzene, and cyclohexylbenzene. In the present application, the foregoing compound is used as an overcharge prevention agent, and the overcharge prevention performance can be further improved. Fluorobenzene is preferably included in the present application. The voltage rises when the battery cell is overcharged, the overcharge-prevention additive is polymerized, to form an insulating film on the surface of the electrode, which increases the internal resistance of the battery, and reduces or cuts off an overcharge current to improve the safety performance of the battery. On the other hand, a large amount of heat is released, and fluorobenzene substances are polymerized under a high voltage to form a fluoropolymer with better high-temperature resistance. In addition, compared with other benzene ring substances, fluorobenzene substances are more easily combined with electrons due to substitution of fluorine, which can inhibit the reduction side reaction of the compound of formula I at the negative electrode to some extent.

In addition, the mass percentage of the compound of formula II in the electrolytic solution is 9% or less, preferably 3-8%, more preferably 3-7%, further preferably 3-6%, and particularly preferably 3-5%. When the content of the compound of formula II is too high, it is not conducive to the conductivity of the electrolytic solution, and thus not conducive to the kinetic performance of the battery. When the content of the compound of formula II is too low, it is not conducive to the overcharge prevention performance. In the present application, the mass percentage of the compound of formula II in the electrolytic solution is set to the foregoing range, which can further improve the overcharge prevention performance without affecting the conductivity of the electrolytic solution.

In some embodiments, the electrolytic solution makes true: $a/b \geq 11$, preferably $11 \leq a/b \leq 35$, more preferably $11 \leq a/b \leq 33$, further preferably $15 \leq a/b \leq 30$, especially preferably, $16 \leq a/b \leq 27$, where a is a mass percentage of the compound of formula I in the solvent, and b is a mass percentage of the compound of formula II in the electrolytic solution. In the present application, a/b is set to the foregoing range, which can further improve the kinetic performance.

On the other hand, since the LFP material is very easy to absorb water, moisture in the positive electrode sheet cannot be completely removed when the battery cell is packaged before liquid injection in the production process, and in the subsequent use process, the moisture in the positive electrode sheet gradually diffuses into the electrolytic solution, and undergoes a side reaction with lithium hexafluorophosphate ($LiPF_6$) in the electrolytic solution to generate hydrogen fluoride, and an SEI (solid electrolyte interphase) film is destroyed, so that stability of the negative electrode interface is deteriorated, resulting in accelerated cycle decay. The applicant found that a lithium salt that is not sensitive to water (such as the compound of formula III described below) is used, which can reduce the influence of moisture on the electrode sheet and avoid side reactions between the lithium salt and water. However, similar to the compound of formula I, an oxidation potential of the compound of formula III is also low, which greatly affects overcharge performance of LFP battery cells. The compound of formula II is added to the electrolytic solution to be used as an overcharge-prevention additive, and the purpose of increasing the safety of the battery can be improved.

Therefore, in some embodiments, the electrolytic solution of the present application includes an electrolyte salt, and preferably the electrolyte salt includes a compound of formula III, Formula III

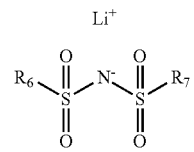

where $R_6$ and $R_7$ are each independently an F atom or a fluoroalkyl group. The alkyl group in the fluoroalkyl group may be a methyl group, an ethyl group, a propyl group, or the like, and the fluoroalkyl group may be a partially fluorinated alkyl group or a fully fluorinated alkyl group, and examples thereof include: lithium bis(trifluoromethanesulfonyl)imide, lithium bis(perfluorobutanesulfonyl)imide, lithium bis(pentafluoroethanesulfonyl)imide $(C_4F_{10}LiNO_4S_2)$. In addition, $R_6$ and $R_7$ may be linked to form a cycle, and examples thereof include: 1,1,2,2,3,3-hexafluoropropane-1,3-disulfonimide lithium $(C3F_6LiNO_4S_2)$.

In some embodiments, the compound of formula III described above preferably includes at least one selected from lithium bisfluorosulfonimide (LiFSI) and lithium bis (trifluoromethanesulfonyl)imide (LiTFSI). More preferably, lithium bisfluorosulfonimide (LiFSI) is included. The lithium salts described above are not sensitive to moisture and can mitigate a negative effect of increased moisture caused by thick-coated electrode sheet. Therefore, the compound of formula III is selected as the electrolyte salt, which can further improve the resistance of the electrolytic solution to water and improve thermal cycle characteristics of the battery, especially the thermal cycle characteristic at 45° C.

The molar percentage of the compound of formula III in the electrolyte salt may be 10% or more, preferably 20% or more, more preferably 30% or more, further preferably 40% or more, and particularly preferably 50% or more, in addition, it may be preferably 80% or less, more preferably 75% or less, further preferably 70% or less, and particularly preferably 60% or less. In the present application, the molar percentage of the compound of formula III in the electrolyte salt is set to the foregoing range, the resistance of the electrolytic solution to water can be increased.

In addition, the electrolyte salt may further include lithium hexafluorophosphate $(LiPF_6)$, which is strong in oxidation resistance, but poor in thermal stability, and is easy to decompose when exposed to water. The electrolytic solution of the present application includes lithium salts of the compound of formula III, and these lithium salts have good thermal stability. Therefore, by adding lithium hexafluorophosphate and the lithium salt of the compound of formula III, oxidation resistance as well as thermal stability can be achieved.

In some embodiments, the electrolytic solution of the present application may further include the following additives, specifically, for example, vinylene carbonate (VC), fluoroethylene carbonate (FEC), vinyl sulfate (DTD), 1,3-propane sultone (PS), lithium difluorobisoxalate phosphate (LiDFOP), lithium difluoro(oxalato)borate (LiDFOB), and lithium bis(oxalato)borate (LiBOB). Vinylene carbonate (VC), fluoroethylene carbonate (FEC), vinyl sulfate (DTD), and 1,3-propane sultone (PS) can be used as film-forming additives. When vinylene carbonate (VC) and 1,3-propane sultone (PS) are used as film-forming additives, the resistance is large, and the film-forming stability is good. However, when fluoroethylene carbonate (FEC), and vinyl sulfate (DTD) are used as film-forming additives, the resistance is low, and the film-forming stability is poor. In addition, the additives such as lithium difluorobisoxalate phosphate (LiDFOP), lithium difluoro(oxalato)borate (LiDFOB), and lithium bis(oxalato)borate (LiBOB) are not sensitive to water, which can mitigate the negative effects of increased moisture caused by thick-coated electrode sheets. Therefore, the additive is added, and the cycle characteristic and thermal stability of the battery can be further improved.

In some embodiments, the electrolytic solution of the present application has a conductivity of 13 mS/cm or more at 25° C., for example, 14 mS/cm-18 mS/cm, 15 mS/cm-17 mS/cm, and 16 mS/cm-17 mS/cm. When the conductivity of the electrolytic solution is too small, the kinetic performance of the electrolytic solution is insufficient, and when a coating thickness of the positive electrode sheet is thick, the kinetic performance of the battery is affected; and when the conductivity of the electrolytic solution is too large, the thermal stability of the electrolytic solution is insufficient, and the high-temperature performance of the battery may be affected. In the present application, when the conductivity of the electrolytic solution is within the foregoing range at 25° C., the kinetic performance of the electrolytic solution can be improved, and the high and low temperature performance of the battery and the energy density of the battery can be improved.

Secondary Battery

In a second aspect of the present application, a secondary battery is provided, including the foregoing electrolytic solution. The secondary battery of the present application can achieve good kinetic performance, high-temperature performance, as well as excellent overcharge prevention performance.

The secondary battery of the present application may be a lithium-ion secondary battery, or the like. Generally, a secondary battery includes a positive electrode sheet, a negative electrode sheet, an electrolytic solution, and a separator. During charging and discharging of a battery, active ions are intercalated and deintercalated back and forth between the positive electrode sheet and the negative electrode sheet. The electrolytic solution plays a role of conducting ions between the positive electrode sheet and the negative electrode sheet. The separator is disposed between the positive electrode sheet and the negative electrode sheet, which mainly plays the role of preventing a short circuit between the positive and negative electrodes while allowing ions to pass through.

[Positive Electrode Sheet]

The positive electrode sheet includes a positive electrode current collector, and a positive electrode film layer disposed on at least one surface of the positive electrode current collector, and the positive electrode film layer includes a positive active material.

As an example, the positive electrode current collector has two opposite surfaces in its thickness direction, and the positive electrode film layer is disposed on either or both of the two opposite surfaces of the positive electrode current collector.

The positive electrode current collector may be a metal foil or a composite current collector. For example, as the metal foil, an aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver, silver alloy, or the like) on a polymer material substrate (such as a substrate of polypropylene (PP), polyethylene terephthalate (PET), polybutylene terephthalate (PBT), polystyrene (PS), polyethylene (PE), or the like).

The positive active material may employ a positive active material for a battery known in the art. As an example, the positive active material may include a lithium-containing phosphate of an olivine structure, whereby the cycle life of the battery can be improved. In addition, the positive active material may further include a lithium transition metal oxide and modified compounds thereof. However, the present application is not limited to these materials, and other conventional materials that can be used as a positive active material for a battery may also be used. One type of these positive active materials may be used alone, or two or more types thereof may be used in combination. Examples of the lithium-containing phosphate of the olivine structure may include, but are not limited to, at least one of lithium iron phosphate (such as LiFePO$_4$ (LFP for short)), composite materials of lithium iron phosphate and carbon, lithium manganese phosphate (such as LiMnPO$_4$), composite materials of lithium manganese phosphate and carbon, lithium manganese iron phosphate, and composite materials of lithium manganese iron phosphate and carbon. Examples of the lithium transition metal oxide may include, but are not limited to, at least one of lithium cobalt oxides (such as LiCoO$_2$), lithium nickel oxides (such as LiNiO$_2$), lithium manganese oxides (such as LiMnO$_2$, LiMn$_2$O$_4$), lithium nickel cobalt oxides, lithium manganese cobalt oxides, lithium nickel manganese oxides, lithium nickel cobalt manganese oxides (such as LiNi$_{1/3}$Co$_{1/3}$Mn$_{1/3}$O$_2$ (NCM$_{333}$ for short), LiNi$_{0.5}$Co$_{0.2}$Mn$_{0.3}$O$_2$ (NCM$_{523}$ for short), LiNi$_{0.5}$Co$_{0.25}$Mn$_{0.25}$O$_2$ (NCM$_{211}$ for short), LiNi$_{0.6}$Co$_{0.2}$Mn$_{0.2}$O$_2$ (NCM$_{622}$ for short), LiNi$_{0.8}$Co$_{0.1}$Mn$_{0.1}$O$_2$ (NCM$_{811}$ for short)), lithium nickel cobalt aluminum oxides (such as LiNi$_{0.85}$Co$_{0.15}$Al$_{0.05}$O$_2$), their modified compounds, or the like.

The positive electrode film layer also optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluoro containing acrylate resin.

The positive electrode film layer also optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, a thickness of the single-faced positive electrode film layer is 0.08 mm or more, optionally 0.09 mm-0.3 mm.

In some embodiments, the positive electrode sheet may be prepared in the following manner. The foregoing components for preparing the positive electrode sheet such as the positive active material, the conductive agent, the binder, and any other components are dispersed in a solvent (such as N-methylpyrrolidone), to form a positive electrode slurry, the positive electrode slurry is coated on the positive electrode current collector, and then after drying, cold pressing and other processes are performed, a positive electrode sheet may be obtained.

[Negative Electrode Sheet]

A negative electrode sheet includes a negative electrode current collector and a negative electrode film layer disposed on at least one surface of the negative electrode current collector, and the negative electrode film layer includes a negative active material.

As an example, the negative electrode current collector has two opposite surfaces in its thickness direction, and the negative electrode film layer is disposed on either or both of the two opposite surfaces of the negative electrode current collector.

The negative electrode current collector may be a metal foil or a composite current collector. For example, as the metal foil, a copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on a polymer material substrate (such as a substrate of polypropylene (PP), polyethylene terephthalate (PET), polybutylene terephthalate (PBT), polystyrene (PS), polyethylene (PE), or the like).

The negative active material may employ a negative active material for a battery known in the art. As an example, the negative active material may include at least one of artificial graphite, natural graphite, soft carbon, hard carbon, silicon-based materials, tin-based materials, lithium titanate, or the like. The silicon-based material may be selected from at least one of elemental silicon, silicon-oxygen compounds, silicon-carbon composites, silicon-nitrogen composites, and silicon alloys. The tin-based material may be selected from at least one of elemental tin, tin oxide compounds, and tin alloys. However, the present application is not limited to these materials, and other conventional materials that can be used as a negative active material for a battery may also be used. One type of these negative active materials may be used alone, or two or more types thereof may be used in combination.

The negative electrode film layer also optionally includes a binder. The binder may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

The negative electrode film layer also optionally includes a conductive agent. The conductive agent may be selected from at least one of superconducting carbon, acetylene black, carbon black, Ketjen black, carbon dots, carbon nanotubes, graphene, and carbon nanofibers.

The negative electrode film layer also optionally includes other adjuvants, for example, thickening agents (such as sodium carboxymethyl cellulose (CMC-Na)), or the like.

In some embodiments, the negative electrode sheet may be prepared in the following manner. The foregoing components for preparing the negative electrode sheet such as the negative active material, the conductive agent, the binder, and any other components are dispersed in a solvent (such as deionized water), to form a negative electrode slurry, the negative electrode slurry is coated on the negative electrode current collector, and then after drying, cold pressing and other processes are performed, a negative electrode sheet may be obtained.

[Electrolytic Solution]

The electrolytic solution plays the role of conducting ions between the positive electrode sheet and the negative electrode sheet. As for the electrolytic solution, the electrolytic solution described in the item "Electrolytic Solution" is used.

[Separator]

In some embodiments, a separator is further included in the secondary battery. The type of the separator is not particularly limited in the present application, and any known porous structure separator with good chemical stability and mechanical stability may be selected.

In some embodiments, the material of the separator may be selected from at least one of glass fiber, non-woven fabric, polyethylene, polypropylene, and polyvinylidene difluoride. The separator may be a single-layer film or a multi-layer composite film, which is not particularly limited. When the separator is a multi-layer composite film, the materials of each layer may be the same or different, which is not particularly limited.

[Secondary Battery]

In some embodiments, the positive electrode sheet, the negative electrode sheet, and the separator may be subject to a winding process or a lamination process, to obtain an electrode assembly.

In some embodiments, the secondary battery may include an outer package. The outer package may be used to package the foregoing electrode assembly and electrolyte.

In some embodiments, the outer package of the secondary battery may be a hard shell such as a hard plastic shell, an aluminum shell, or a steel shell. The outer package of the secondary battery may be a soft package, such as a bag-type soft package. A material of the soft package may be plastic, for example, polypropylene, polybutylene terephthalate, and polybutylene succinate.

The shape of the secondary battery is not particularly limited in the present application, and may be cylindrical, square, or any other shape. For example, FIG. 1 shows a secondary battery 5 of a square structure as an example.

Figure 2:
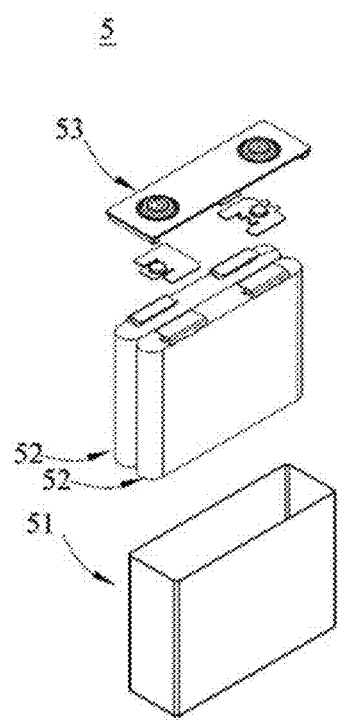
FIG. 2 is an exploded view of the secondary battery according to the embodiment of the present application shown in FIG. 1.

In some embodiments, referring to FIG. 2, the outer package may include a housing 51 and a cover plate 53. The housing 51 may include a bottom plate and a side plate connected to the bottom plate. The bottom plate and the side plate are enclosed to form an accommodating cavity. The housing 51 has an opening communicating with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, and the specific number may be selected by persons skilled in the art according to specific actual needs.

In some embodiments, secondary batteries may be assembled into a battery module, and the number of secondary batteries included in the battery module may include one or more, and the specific number may be selected by persons skilled in the art according to application and capacity of the battery module.

Figure 3:
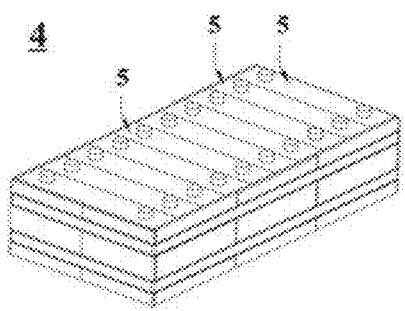
FIG. 3 is a schematic diagram of a battery module according to an embodiment of the present application.

FIG. 3 shows a battery module 4 as an example. Referring to FIG. 3, in the battery module 4, a plurality of secondary batteries 5 may be sequentially arranged along a length direction of the battery module 4. Certainly, they may be arranged in accordance with any other manner. Further, the plurality of secondary batteries 5 may be fixed by using fasteners.

Optionally, the battery module 4 may further include a shell with an accommodating space, and the plurality of secondary batteries 5 are accommodated in the accommodating space.

In some embodiments, battery modules may be further assembled into a battery pack, and the number of battery modules included in the battery pack may be one or more, and the specific number may be selected by persons skilled in the art according to application and capacity of the battery pack.

Figure 4:
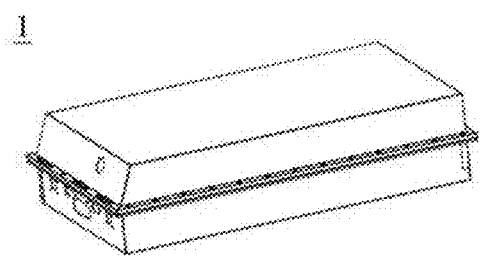
FIG. 4 is a schematic diagram of a battery pack according to an embodiment of the present application.
Figure 5:
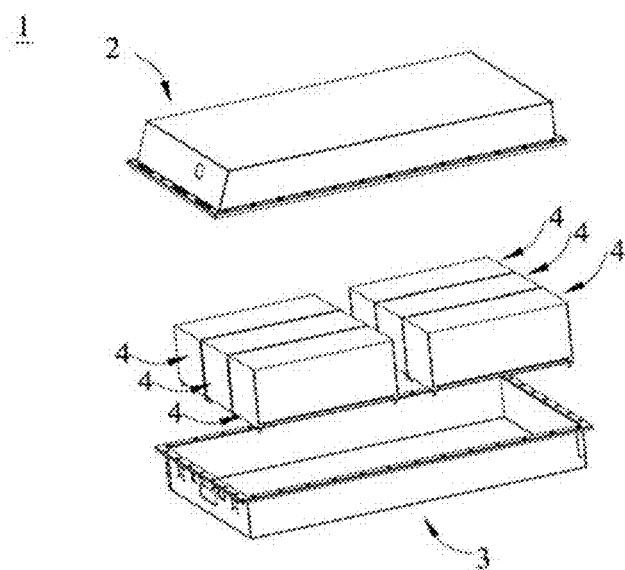
FIG. 5 is an exploded view of the battery pack according to the embodiment of the present application shown in FIG. 4.

FIG. 4 and FIG. 5 show a battery pack 1 as an example. Referring to FIG. 4 and FIG. 5, the battery pack 1 may include a battery box and a plurality of battery modules 4 disposed in the battery box. The battery box includes an upper box 2 and a lower box 3. The upper box 2 can cover the lower box 3 and form an enclosed space for accommodating the battery modules 4. The plurality of battery modules 4 may be arranged in the battery box in any manner.

In some embodiments, the secondary battery of the present application makes true 1 g/1000 m²≤L≤5 g/1000 m², preferably 1 g/1000 m²≤L≤4 g/1000 m², further preferably 1.5 g/1000 m²≤L≤4 g/1000 m², more preferably 1.5 g/1000 m² or more and 3.5 g/1000 m² or less. $L=M1/[M2\times B\times(a+c)]*1000$, where M1 is mass of the compound of formula II with a unit of g, M2 is mass of the positive active material with a unit of g, B is a specific surface area of the positive active material with a unit of m²/g, a is a mass percentage of the compound of formula I in the solvent, and c is a molar percentage of the compound of formula III in the electrolyte salt. L is in the foregoing range, and the kinetic performance, high-temperature performance, and overcharge prevention performance of the battery can be further improved.

In some embodiments, 8 m²/g≤B≤16 m²/g; optionally 10 m²/g≤B≤14 m²/g. When the specific surface area of the positive active material is too large, side reactions may increase, thereby affecting performance of the battery. When the specific surface area of the positive active material is too small, the transport of lithium ions inside the particles is hindered, thereby affecting performance of the battery. The specific surface area of the positive active material is set to the foregoing range, and solid phase diffusion inside the positive electrode sheet can be improved, which is conducive to improving the kinetic performance of the battery cell.

Power Consumption Apparatus

In a third aspect of the present application, a power consumption apparatus is provided, including the foregoing secondary battery. The power consumption apparatus of the present application includes the foregoing secondary battery, and therefore has all the advantageous effects of the secondary battery.

The secondary battery may be used as a power source of the power consumption apparatus or may be used as an energy storage unit of the power consumption apparatus. The power consumption apparatus may be selected from a mobile device (for example, a mobile phone, a notebook computer), an electric vehicle (for example, a pure electric vehicle, a hybrid electric vehicle, a plug-in hybrid electric vehicle, an electric bicycle, an electric scooter, an electric golf cart, an electric truck), an electric train, a ship and a satellite, an energy storage system, or the like, but is not limited to this.

As the power consumption apparatus, a secondary battery, a battery module, or a battery pack may be selected according to usage requirements.

Figure 6:
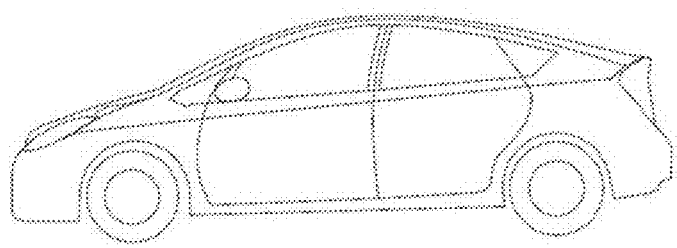
FIG. 6 is a schematic diagram of a power consumption apparatus in which a secondary battery is used as a power source according to an embodiment of the present application.

FIG. 6 shows a power consumption apparatus as an example. The power consumption apparatus is a pure electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

EMBODIMENT

Hereinafter, an embodiment of the present application will be described. The embodiments described below are illustrative, only used to explain the present application, and should not be construed as a limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

Embodiment 1

Preparation of Positive Electrode Sheet

An olivine-structured lithium iron phosphate (LFP), polyvinylidene fluoride (PVDF), and carbon black (SP) were mixed with a solvent in a mass ratio of 97:2.5:0.5, and were stirred to obtain a uniformly dispersed positive electrode slurry; and the positive electrode slurry was uniformly coated on both surfaces of an aluminum foil, and drying, cold pressing and cutting were performed, to obtain a positive electrode sheet. The olivine-structured lithium iron phosphate was used as a positive active material, a specific surface area thereof was 12 $m^2/g$, and a thickness of the single-layered membrane after cold pressing was 0.1 mm.

Preparation of Negative Electrode Sheet

A negative active material (artificial graphite), carbon black (SP), styrene butadiene rubber (SBR), carboxymethyl cellulose (CMC) were mixed with a solvent in a ratio of 97:0.5:1.5:1, and were stirred, to obtain a uniformly dispersed negative electrode slurry; and the negative electrode slurry was uniformly coated on both surfaces of a copper foil, and drying, cold pressing and cutting were performed, to obtain a negative electrode sheet. A thickness of the single-layered membrane after cold pressing was 0.07 mm.

Separator

A polyethylene film was used as the separator.

Preparation of Electrolytic Solution

In an argon atmosphere glove box, 35% of ethyl acetate, 30% of ethylene carbonate, and 35% of dimethyl carbonate were mixed in mass %, to obtain an organic solvent mixed solution, then fluorobenzene was added to the organic solvent mixed solution in such a manner that a mass percentage in the obtained electrolytic solution was 3%, and then lithium hexafluorophosphate ($LiPF_6$) with a concentration of 1 mol/L was slowly added as an electrolyte salt; and they were stirred until complete dissolution, to obtain an electrolytic solution.

Preparation of Lithium-Ion Secondary Battery

A positive electrode sheet, a separator and a negative electrode sheet were stacked in order, so that the separator was placed between the positive electrode sheet and the negative electrode sheet to play the role of separation, and then winding was performed, to obtain an electrode assembly; the electrode assembly was put in an outer package, drying was performed and then an electrolytic solution was injected, and processes such as formation, and standing were performed, to obtain a secondary battery. The final lithium-ion battery contained 1400 g of the positive active material and 620 g of the electrolytic solution.

Embodiment 2

In the preparation of an electrolytic solution, 40% of ethyl acetate, 30% of ethylene carbonate, and 30% of dimethyl carbonate were mixed in mass %, to obtain an organic solvent mixed solution. Other than that, it is the same as Embodiment 1.

Embodiment 3

In the preparation of an electrolytic solution, 50% of ethyl acetate, 30% of ethylene carbonate, and 20% of dimethyl carbonate were mixed in mass %, to obtain an organic solvent mixed solution. Other than that, it is the same as Embodiment 1.

Embodiment 4

In the preparation of an electrolytic solution, 60% of ethyl acetate, 30% of ethylene carbonate, and 10% of dimethyl carbonate were mixed in mass %, to obtain an organic solvent mixed solution. Other than that, it is the same as Embodiment 1.

Embodiment 5

In the preparation of an electrolytic solution, 70% of ethyl acetate and 30% of ethylene carbonate were mixed in mass %, to obtain an organic solvent mixed solution. Other than that, it is the same as Embodiment 1.

Embodiment 6

In the preparation of an electrolytic solution, 80% of ethyl acetate and 20% of ethylene carbonate were mixed in mass %, to obtain an organic solvent mixed solution. Other than that, it is the same as Embodiment 1.

Embodiment 7

In the preparation of an electrolytic solution, 50% of methyl formate, 30% of ethylene carbonate and 20% of dimethyl carbonate were mixed in mass %, to obtain an organic solvent mixed solution. Other than that, it is the same as Embodiment 1.

Embodiment 8

In the preparation of an electrolytic solution, 50% of methyl acetate, 30% of ethylene carbonate and 20% of dimethyl carbonate were mixed in mass %, to obtain an organic solvent mixed solution. Other than that, it is the same as Embodiment 1.

Embodiment 9

In the preparation of an electrolytic solution, 50% of propyl acetate, 30% of ethylene carbonate and 20% of dimethyl carbonate were mixed in mass %, to obtain an organic solvent mixed solution. Other than that, it is the same as Embodiment 1.

Embodiment 10

In the preparation of an electrolytic solution, 50% of methyl acrylate, 30% of ethylene carbonate and 20% of dimethyl carbonate were mixed in mass %, to obtain an organic solvent mixed solution. Other than that, it is the same as Embodiment 1.

Embodiment 11

In the preparation of an electrolytic solution, 50% of ethyl acrylate, 30% of ethylene carbonate and 20% of dimethyl carbonate were mixed in mass %, to obtain an organic solvent mixed solution. Other than that, it is the same as Embodiment 1.

Embodiment 12

In the preparation of an electrolytic solution, in an organic solvent mixed solution, fluorobenzene was added in such a manner that a mass percentage thereof in the obtained electrolytic solution was 1%. Other than that, it is the same as Embodiment 3.

Embodiment 13

In the preparation of an electrolytic solution, in an organic solvent mixed solution, fluorobenzene was added in such a manner that a mass percentage thereof in the obtained electrolytic solution was 2%. Other than that, it is the same as Embodiment 3.

Embodiment 14

In the preparation of an electrolytic solution, in an organic solvent mixed solution, fluorobenzene was added in such a manner that a mass percentage thereof in the obtained electrolytic solution was 4%. Other than that, it is the same as Embodiment 3.

Embodiment 15

In the preparation of an electrolytic solution, in an organic solvent mixed solution, fluorobenzene was added in such a manner that a mass percentage thereof in the obtained electrolytic solution was 5%. Other than that, it is the same as Embodiment 3.

Embodiment 16

In the preparation of an electrolytic solution, in an organic solvent mixed solution, fluorobenzene was added in such a manner that a mass percentage thereof in the obtained electrolytic solution was 9%. Other than that, it is the same as Embodiment 3.

Embodiment 17

In the preparation of an electrolytic solution, in an organic solvent mixed solution, biphenyl was added in such a manner that a mass percentage thereof in the obtained electrolytic solution was 3%. Other than that, it is the same as Embodiment 3.

Embodiment 18

In the preparation of an electrolytic solution, in an organic solvent mixed solution, cyclohexylbenzene was added in such a manner that a mass percentage thereof in the obtained electrolytic solution was 3%. Other than that, it is the same as Embodiment 3.

Embodiment 19

In the preparation of an electrolytic solution, lithium hexafluorophosphate ($LiPF_6$) with a concentration of 0.5 mol/L and lithium bisfluorosulfonimide with a concentration of 0.5 mol/L were slowly added as electrolyte salts, where molar percentages of lithium hexafluorophosphate ($LiPF_6$) and lithium bisfluorosulfonimide in the electrolyte salts were 50%, respectively. Other than that, it is the same as Embodiment 3.

Embodiment 20

In the preparation of an electrolytic solution, lithium hexafluorophosphate ($LiPF_6$) with a concentration of 0.5 mol/L and lithium bis(trifluoromethanesulfonyl)imide with a concentration of 0.5 mol/L were slowly added as electrolyte salts, where molar percentages of lithium hexafluorophosphate ($LiPF_6$) and lithium bis(trifluoromethanesulfonyl)imide in the electrolyte salts were 50%, respectively. Other than that, it is the same as Embodiment 3.

Embodiment 21

In the preparation of an electrolytic solution, in an organic solvent mixed solution, fluorobenzene was added in such a manner that a mass percentage thereof in the obtained electrolytic solution was 3%, and vinylene carbonate was added in such a manner that a mass percentage thereof in the obtained electrolytic solution was 2%. Other than that, it is the same as Embodiment 19.

Embodiment 22

In the preparation of an electrolytic solution, in an organic solvent mixed solution, fluorobenzene was added in such a manner that a mass percentage thereof in the obtained electrolytic solution was 3%, and fluoroethylene carbonate was added in such a manner that a mass percentage thereof in the obtained electrolytic solution was 1%. Other than that, it is the same as Embodiment 19.

Embodiment 23

In the preparation of an electrolytic solution, in an organic solvent mixed solution, fluorobenzene was added in such a manner that a mass percentage thereof in the obtained electrolytic solution was 3%, and vinyl sulfate was added in such a manner that a mass percentage thereof in the obtained electrolytic solution was 1%. Other than that, it is the same as Embodiment 19.

Comparative Example 1

In the preparation of an electrolytic solution, 30% of ethyl acetate, 30% of ethylene carbonate, and 40% of dimethyl carbonate were mixed in mass %, to obtain an organic solvent mixed solution. Other than that, it is the same as Embodiment 1.

Comparative Example 2

In the preparation of an electrolytic solution, 30% of ethylene carbonate and 70% of dimethyl carbonate were mixed in mass %, to obtain an organic solvent mixed solution. Other than that, it is the same as Embodiment 1.

Comparative Example 3

In the preparation of an electrolytic solution, no fluorobenzene was added. Other than that, it is the same as Embodiment 3.

The relevant parameters for Embodiments 1-23 and Comparative Examples 1-3 are shown in Table 1 below.

TABLE 1

| Serial number | Solvent | | Additive | | Electrolyte salt |
|---|---|---|---|---|---|
| | Type | Content | Type | Content | Type |
| Embodiment 1 | Ethyl acetate:ethylene carbonate:dimethyl carbonate | 35%:30%:35% | Fluorobenzene | 3% | Lithium hexafluorophosphate |

TABLE 1-continued

| | | | | | |
|---|---|---|---|---|---|
| Embodiment 2 | Ethyl acetate:ethylene carbonate:dimethyl carbonate | 40%:30%:30% | Fluorobenzene | 3% | Lithium hexafluorophosphate |
| Embodiment 3 | Ethyl acetate:ethylene carbonate:dimethyl carbonate | 50%:30%:20% | Fluorobenzene | 3% | Lithium hexafluorophosphate |
| Embodiment 4 | Ethyl acetate:ethylene carbonate:dimethyl carbonate | 60%:30%:10% | Fluorobenzene | 3% | Lithium hexafluorophosphate |
| Embodiment 5 | Ethyl acetate:ethylene carbonate | 70%:30% | Fluorobenzene | 3% | Lithium hexafluorophosphate |
| Embodiment 6 | Ethyl acetate:ethylene carbonate | 80%:20% | Fluorobenzene | 3% | Lithium hexafluorophosphate |
| Embodiment 7 | Methyl formate:ethylene carbonate:dimethyl carbonate | 50%:30%:20% | Fluorobenzene | 3% | Lithium hexafluorophosphate |
| Embodiment 8 | Methyl acetate:ethylene carbonate:dimethyl carbonate | 50%:30%:20% | Fluorobenzene | 3% | Lithium hexafluorophosphate |
| Embodiment 9 | Propyl acetate:ethylene carbonate:dimethyl carbonate | 50%:30%:20% | Fluorobenzene | 3% | Lithium hexafluorophosphate |
| Embodiment 10 | Methyl acrylate:ethylene carbonate:dimethyl carbonate | 50%:30%:20% | Fluorobenzene | 3% | Lithium hexafluorophosphate |
| Embodiment 11 | Ethyl acrylate:ethylene carbonate:dimethyl carbonate | 50%:30%:20% | Fluorobenzene | 3% | Lithium hexafluorophosphate |
| Embodiment 12 | Ethyl acetate:ethylene carbonate:dimethyl carbonate | 50%:30%:20% | Fluorobenzene | 1% | Lithium hexafluorophosphate |
| Embodiment 13 | Ethyl acetate:ethylene carbonate:dimethyl carbonate | 50%:30%:20% | Fluorobenzene | 2% | Lithium hexafluorophosphate |
| Embodiment 14 | Ethyl acetate:ethylene carbonate:dimethyl carbonate | 50%:30%:20% | Fluorobenzene | 4% | Lithium hexafluorophosphate |
| Embodiment 15 | Ethyl acetate:ethylene carbonate:dimethyl carbonate | 50%:30%:20% | Fluorobenzene | 5% | Lithium hexafluorophosphate |
| Embodiment 16 | Ethyl acetate:ethylene carbonate:dimethyl carbonate | 50%:30%:20% | Fluorobenzene | 9% | Lithium hexafluorophosphate |
| Embodiment 17 | Ethyl acetate:ethylene carbonate:dimethyl carbonate | 50%:30%:20% | Biphenyl | 3% | Lithium hexafluorophosphate |
| Embodiment 18 | Ethyl acetate:ethylene carbonate:dimethyl carbonate | 50%:30%:20% | Cyclohexylbenzene | 3% | Lithium hexafluorophosphate |
| Embodiment 19 | Ethyl acetate:ethylene carbonate:dimethyl carbonate | 50%:30%:20% | Fluorobenzene | 3% | Lithium hexafluorophosphate, and lithium bisfluorosulfonimide |
| Embodiment 20 | Ethyl acetate:ethylene carbonate:dimethyl carbonate | 50%:30%:20% | Fluorobenzene | 3% | Lithium hexafluorophosphate, and lithium bis(trifluoromethanesulforyl)imide |
| Embodiment 21 | Ethyl acetate:ethylene carbonate:dimethyl carbonate | 50%:30%:20% | Fluorobenzene, and vinylene carbonate | 3%, 2% | Lithium hexafluorophosphate, and lithium bisfluorosulfonimide |
| Embodiment 22 | Ethyl acetate:ethylene carbonate:dimethyl carbonate | 50%:30%:20% | Fluorobenzene, and fluoroethylene carbonate | 3%, 1% | Lithium hexafluorophosphate, and lithium bisfluorosulfonimide |
| Embodiment 23 | Ethyl acetate:ethylene carbonate:dimethyl carbonate | 50%:30%:20% | Fluorobenzene, and vinyl sulfate | 3%, 1% | Lithium hexafluorophosphate, and lithium bisfluorosulfonimide |
| Comparative Example 1 | Ethyl acetate:ethylene carbonate:dimethyl carbonate | 30%:30%:40% | Fluorobenzene | 3% | Lithium hexafluorophosphate |
| Comparative Example 2 | Ethylene carbonate:dimethyl carbonate | 30%:70% | Fluorobenzene | 3% | Lithium hexafluorophosphate |
| Comparative Example 3 | Ethyl acetate:ethylene carbonate:dimethyl carbonate | 50%:30%:20% | / | 0 | Lithium hexafluorophosphate |

| | | | | | Battery performance | |
|---|---|---|---|---|---|---|
| Serial number | Electrolyte salt Molar concentration mol/L | a/b | L(g/1000 m²) | Initial DCR mOhm | Capacity retention rate after 100 cycles at 45° C. | Overcharge prevention performance (the number of times of which the overcharge test is passed) |
| Embodiment 1 | 1 | 11.7 | 3.16 | 3.0 | 83.0% | 30/30 |
| Embodiment 2 | 1 | 13.3 | 2.77 | 2.9 | 83.0% | 30/30 |
| Embodiment 3 | 1 | 16.7 | 2.21 | 2.8 | 82.8% | 30/30 |
| Embodiment 4 | 1 | 20.0 | 1.85 | 2.7 | 82.7% | 30/30 |
| Embodiment 5 | 1 | 23.3 | 1.58 | 2.6 | 82.6% | 30/30 |
| Embodiment 6 | 1 | 26.7 | 1.38 | 2.8 | 82.4% | 24/30 |
| Embodiment 7 | 1 | 16.7 | 2.21 | 2.2 | 82.1% | 30/30 |
| Embodiment 8 | 1 | 16.7 | 2.21 | 2.5 | 82.4% | 30/30 |
| Embodiment 9 | 1 | 16.7 | 2.21 | 2.9 | 83.0% | 30/30 |

TABLE 1-continued

| | | | | | | |
|---|---|---|---|---|---|---|
| Embodiment 10 | 1 | 16.7 | 2.21 | 2.9 | 83.0% | 30/30 |
| Embodiment 11 | 1 | 16.7 | 2.21 | 3.0 | 83.2% | 30/30 |
| Embodiment 12 | 1 | 50.0 | 0.74 | 2.2 | 83.0% | 15/30 |
| Embodiment 13 | 1 | 25.0 | 1.48 | 2.6 | 82.8% | 27/30 |
| Embodiment 14 | 1 | 12.5 | 2.95 | 3.2 | 82.8% | 30/30 |
| Embodiment 15 | 1 | 10.0 | 3.96 | 3.5 | 82.6% | 30/30 |
| Embodiment 16 | 1 | 5.6 | 6.64 | 4.0 | 82.2% | 30/30 |
| Embodiment 17 | 1 | 16.7 | 2.21 | 3.0 | 82.6% | 30/30 |
| Embodiment 18 | 1 | 16.7 | 2.21 | 2.9 | 82.7% | 30/30 |
| Embodiment 19 | 0.5, 0.5 | 16.7 | 1.11 | 2.6 | 85.8% | 17/30 |
| Embodiment 20 | 0.5, 0.5 | 16.7 | 1.11 | 2.6 | 85.8% | 18/30 |
| Embodiment 21 | 0.5, 0.5 | 16.7 | 1.11 | 2.6 | 89.7% | 20/30 |
| Embodiment 22 | 0.5, 0.5 | 16.7 | 1.11 | 2.5 | 87.4% | 19/30 |
| Embodiment 23 | 0.5, 0.5 | 16.7 | 1.11 | 2.5 | 87.1% | 19/30 |
| Comparative Example 1 | 1 | 10.0 | 3.69 | 3.6 | 82.1% | 30/30 |
| Comparative Example 2 | 1 | 0.0 | / | 6.0 | 81.0% | 30/30 |
| Comparative Example 3 | 1 | / | 0.00 | 2.1 | 83.0% | 0/30 |

Note: in Table 1, content of each solvent refers to a mass percentage of each solvent in total mass of solvents;

content of each additive refers to a mass percentage of each additive in an electrolytic solution;

a is a mass percentage of a compound of formula I as a solvent in total mass of solvents; and b is a mass percentage of a compound of formula II as an additive in an electrolytic solution;

L=M1/[M2×B×(a+c)]*1000, where M1 is mass of the compound of formula II with a unit of g, M2 is mass of the positive active material with a unit of g, B is a specific surface area of the positive active material with a unit of $m^2/g$, the meaning of a is the same as above, and c is a molar percentage of the compound of formula III as an electrolyte salt in the electrolyte salt.

The test methods are described below.

(1) Initial DCR (Directive Current Resistance, Directive Current Resistance)

At room temperature, the battery of each Embodiment and Comparative Example was charged at a constant current of 0.5 C until a voltage was 3.65 V, and then was charged at a constant voltage until a current was 0.05 C; discharging was performed on the battery at a constant current of 0.5 C for 30 minutes, to adjust the battery to 50% SOC, at which time the voltage of the battery was recorded as U1; and discharging was performed on the battery at a constant current of 4 C for 30 seconds with a result being collected every 0.1 seconds, and the voltage at the end of the discharge was recorded as U2. The initial DCR of the battery was represented by the discharge DCR at 50% SOC of the battery, and the initial DCR of the battery=(U1−U2)/4 C.

(2) High-temperature Cycle Performance of Battery

At 45° C., the battery of each Embodiment and Comparative Example was charged at a constant current of 1.0 C until a voltage was 3.65 V, and then was charged at a constant voltage until a current was 0.05 C; standing was performed on the battery for 5 minutes and discharging was performed at a constant current of 1.0 C until a voltage was 2.5 V; this was the first charge-discharge cycle process of the battery, and a discharge capacity at this time was recorded as a discharge capacity at the first cycle of the battery. Charging and discharging were performed on the battery for 100 cycles according to the foregoing method, and a discharge capacity of the battery after 100 cycles was recorded. A capacity retention rate (%) of the battery after 100 cycles at 45° C.=(a discharge capacity of the battery after 100 cycles/a discharge capacity of the battery at the first cycle)×100%.

(3) Overcharge Prevention Performance of Battery

At 25° C., the battery of each Embodiment and Comparative Example was charged at a constant current of 1 C until a voltage was 3.65 V and a cutoff current was 0.05 C; after the battery was fully charged, the battery was charged at a constant current of 1 C until the voltage reaches 6 V, and observation was performed for 1 hour to confirm whether the battery catches fire and explodes. If there was only smoke and no fire and explosion, it means that the test was passed. If there was a fire or explosion, it means that the test was not passed. The above operations were repeated for 30 times, and the number of times of passing the test (the number of times of which the overcharge test was passed) was recorded.

It can be seen from the results that in Embodiments 1-23, good kinetic performance, high-temperature performance and excellent overcharge prevention performance of the battery are taken into account, and good effects are achieved.

In contrast, in Comparative Example 1, since the content of the compound of formula I was not within the range of the present application, no effective effect was achieved. In particular, the initial DCR increased to 3.6. In Comparative Example 2, no effective effect was achieved since the compound of formula I was not added. In particular, the initial DCR was increased significantly, reaching 6.0, and the kinetics of the battery were deteriorated significantly. In Comparative Example 3, no effective effect was achieved since the compound of formula II was not added. In particular, the overcharge prevention performance was significantly deteriorated. It can be seen that the compound of formula I in a specific amount together with the compound of formula II is used, good kinetic performance, high-temperature performance and excellent overcharge prevention performance of the battery can be taken into account.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. An electrolytic solution, comprising a solvent and an additive,
   wherein the solvent comprises a compound of formula I, and a mass percentage of the compound of formula I in the solvent is 35% or more,

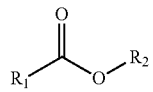

Formula I wherein $R_1$, and $R_2$ are each independently selected from any one of a hydrogen atom, a C1-C3 chain alkyl group, and a C2-C3 alkenyl group;
   the additive comprises a compound of formula II,

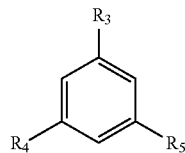

Formula II wherein $R_3$, $R_4$, and $R_5$ are each independently selected from any one of a hydrogen atom, a fluorine atom, a phenyl group, a cyano group, a C1-C6 chain alkyl group, a C3-C6 cyclic alkyl group, and a C2-C6 alkenyl group,
   wherein the electrolytic solution satisfies 11≤a/b≤35,
   wherein a is the mass percentage of the compound of formula I in the solvent, and
   b is a mass percentage of the compound of formula II in the electrolytic solution.

2. The electrolytic solution according to claim 1, wherein the mass percentage of the compound of formula I in the solvent is 40%-70%.

3. The electrolytic solution according to claim 1, wherein a mass percentage of the compound of formula II in the electrolytic solution is 9% or less.

4. The electrolytic solution according to claim 3, wherein the mass percentage of the compound of formula II in the electrolytic solution is 3%-5%.

5. The electrolytic solution according to claim 1, wherein the compound of formula I comprises at least one selected from methyl formate, methyl acetate, ethyl acetate, propyl acetate, methyl acrylate and ethyl acrylate.

6. The electrolytic solution according to claim 1, wherein the compound of formula II comprises at least one of biphenyl, fluorobenzene and cyclohexylbenzene.

7. The electrolytic solution according to claim 1, wherein the electrolytic solution comprises an electrolyte salt, and the electrolyte salt comprises a compound of formula III, and a molar percentage of the compound of formula III in the electrolyte salt is 10% or more,

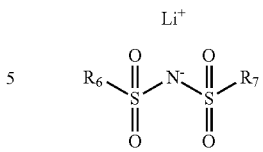

Formula III wherein $R_6$ and $R_7$ are each independently an F atom or a fluoroalkyl group, $R_6$ and $R_7$ can also be linked to form a cycle.

8. The electrolytic solution according to claim 7, wherein the compound of formula III comprises at least one selected from lithium bisfluorosulfonimide and lithium bis(trifluoromethanesulfonyl)imide.

9. The electrolytic solution according to claim 1, wherein the solvent further comprises a carbonate, and a mass percentage of the carbonate in the solvent is 30% or more.

10. The electrolytic solution according to claim 9, wherein the mass percentage of the carbonate in the solvent is 35%-65%.

11. The electrolytic solution according to claim 1, wherein the solvent further comprises ethylene carbonate, and a mass percentage of the ethylene carbonate in the solvent is 30% or more.

12. The electrolytic solution according to claim 1, wherein the additive further comprises at least one selected from vinylene carbonate (VC), fluoroethylene carbonate (FEC), vinyl sulfate (DTD), 1,3-propane sultone (PS), lithium difluorobisoxalate phosphate (LiDFOP), lithium difluoro (oxalato) borate (LiDFOB), and lithium bis(oxalato) borate (LiBOB).

13. A secondary battery, comprising the electrolytic solution according to claim 1.

14. The secondary battery according to claim 13, wherein the secondary battery comprises a positive electrode sheet, the positive electrode sheet comprises a positive electrode film layer, the positive electrode film layer comprises a positive active material, and the positive active material comprises an olivine-structured lithium-containing phosphate.

15. The secondary battery according to claim 14, wherein the secondary battery makes true 1 g/1000 m²≤L≤5 g/1000 m², L=M1/[M2×B×(a+c)]*1000, M1 is mass of the compound of formula II with a unit of g,
   M2 is mass of the positive active material with a unit of g,
   B is a specific surface area of the positive active material with a unit of m²/g,
   a is a mass percentage of the compound of formula I in the solvent, and
   c is a molar percentage of the compound of formula III in the electrolyte salt.

16. The secondary battery according to claim 15, wherein 8 m²/g≤B≤16 m²/g.

17. The secondary battery according to claim 15, wherein a thickness of the single-faced positive electrode film layer is 0.08 mm or more.

18. A power consumption apparatus comprising the secondary battery according to claim 13.

19. The electrolytic solution according to claim 1, wherein the mass percentage of the compound of formula I in the solvent is 60% or more.

* * * * *